PULSE AMPLIFIER FOR ALTERING THE SHAPE OF UNDERSHOOTS

Filed Jan. 7, 1959 3 Sheets-Sheet 1

INVENTORS
Edward Fairstein
AND
Raphael A. Dandl
BY Roland A. Anderson
ATTORNEY

INVENTORS
Edward Fairstein
AND
Raphael A. Dandl
BY Roland A. Anderson
ATTORNEY

PULSE AMPLIFIER FOR ALTERING THE SHAPE OF UNDERSHOOTS
Filed Jan. 7, 1959 3 Sheets-Sheet 3
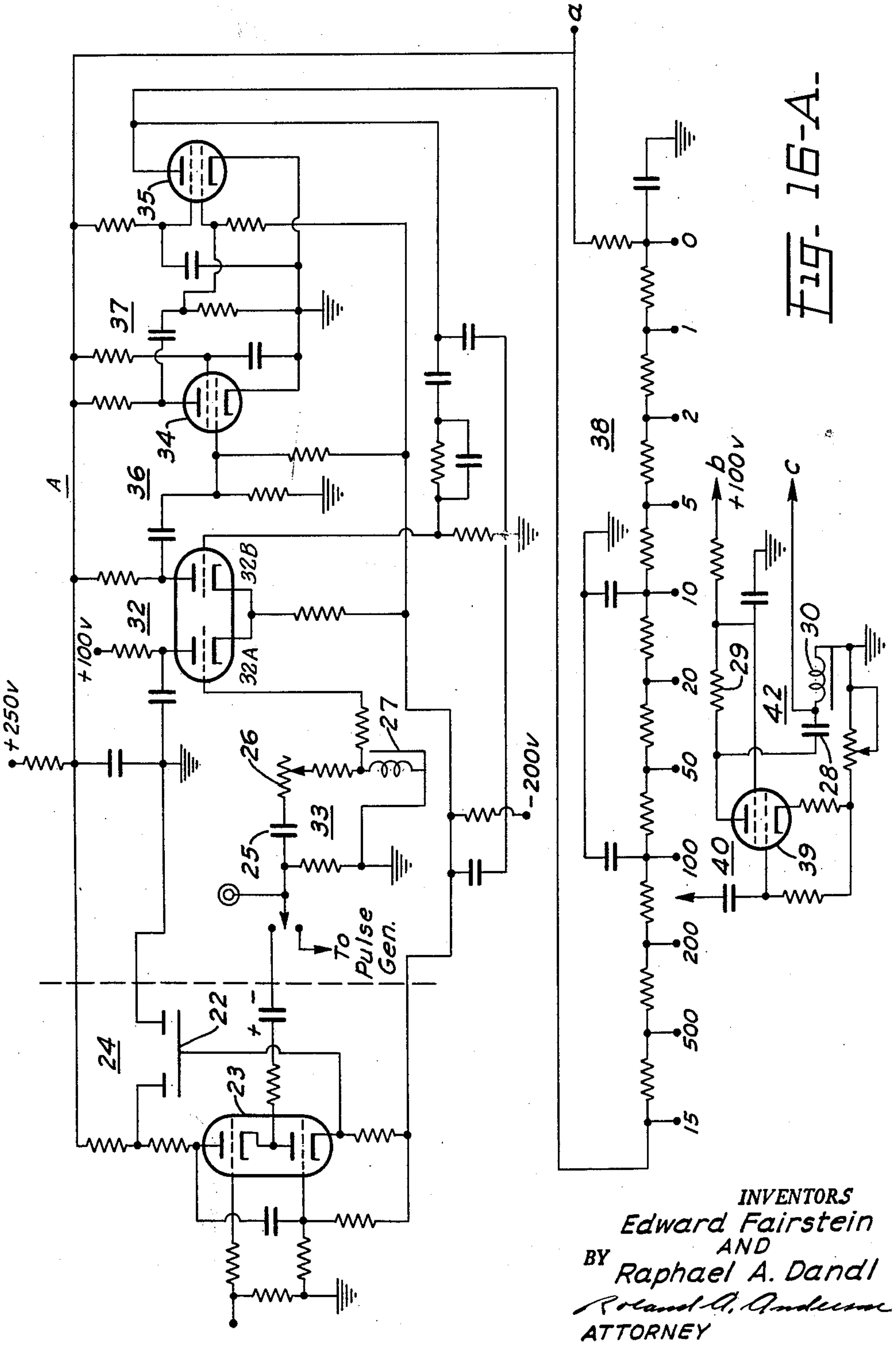
Fig. 16-A
INVENTORS
Edward Fairstein
AND
Raphael A. Dandl
BY
ATTORNEY 3,072,851
Patented Jan. 8, 1963

3,072,851

PULSE AMPLIFIER FOR ALTERING THE SHAPE OF UNDERSHOOTS

Edward Fairstein and Raphael A. Dandl, Oak Ridge, Tenn., assignors to the United States of America as represented by the United States Atomic Energy Commission Filed Jan. 7, 1959, Ser. No. 785,541
5 Claims. (Cl. 328—53)

This invention relates to pulse shapers and more particularly to a pulse shaper for a pulse amplifier which overcomes some of the undesirable effects of undershoots, and is a continuation in part of our earlier copending application, Serial No. 484,087, filed January 25, 1955, now abandoned.

In the prior art of RC coupled pulse amplifiers it is a general practice to make the time constant of one of the coupling networks very much smaller than that of any of the other coupling networks. (See page 126, Electronics by Elmore and Sands, published by McGraw-Hill Book Co., Inc., in 1949.) When a usual radiation detector pulse is applied to such an amplifier, the output pulse has a rapid rise, and an exponential decay which is of greater duration than the rise, but of lesser duration than the original pulse, since the rate of decay depends upon the time constant of the smallest coupling network. In addition, this output pulse undershoots the base line. (See page 118, Vacuum Tube Amplifiers by Valley and Wallman, Rad. Lab. Series, published by McGraw-Hill Book Co., Inc., in 1948.) The amplitude of the undershoot compared to the peak of the first part of the pulse will never exceed the ratio of the shortest time constant to the next to shortest time constant; however, it will approach it for decreasing time constant ratios. Since an RC coupled amplifier can pass no D.C., the long time average of any given pulse must be zero, i.e., the integrated area of the pulse on one side of the base line must be numerically equal to that area on the other side of the base line. Therefore, if the undershoot peak of a pulse is smaller than the amplitude of the positive peak, it will have a greater duration than that of the positive peak.

Under actual counting conditions where pulses occur at a random rate, the situation of pulses occurring in the troughs of the undershoot of earlier pulses is a common phenomenon. (See page 130, Elmore and Sands, supra.) These pulses will appear to have lower amplitudes than the adjacent pulses. It will be understood that the average value of all pulses appears smaller than their true average value by an amount which is numerically equal to the duty cycle of the counting process.

As a consequence of these effects, if attempts are made to get the pulse height distribution of a monoenergetic emitter, it will be found that as the counting rate increases: (1) the peak will broaden, and (2) the peak will shift toward the zero energy axis.

Applicants with a knowledge of all of these problems in the prior art have for an object of their invention the provision of a pulse shaping circuit for an amplifier wherein the magnitude of the pulse undershoot is made substantially the same as that of the original pulse.

Applicants have as another object of their invention the provision of a pulse shaper for an amplifier employing differentiating networks to insure that the magnitude of the pulse undershoot is of substantially the same magnitude as the original pulse.

Applicants have as a further object of their invention the provision of a pulse shaper for an amplifier employing a pair of differentiating networks having substantially equal time constants for producing undershoots which are of about the same magnitude as the original pulses.

Applicants have as a still further object of their invention the provision of a pulse shaper for amplifiers employing shorted delay lines wherein the succeeding undershoots and overshoots of the wave which results from the action of the other coupling networks of the amplifier become so small that their undesirable effect upon the pulse amplitude measurement is overcome.

Other objects and advantages of our invention will appear from the following specification and accompanying drawings, and the novel features thereof will be particularly pointed out in the annexed claims.

In the drawings,

FIGURES 16 (A and B) are a schematic of a circuit incorporating a preferred embodiment of our improved pulse shaper.

FIGURE 17 is a typical wave shape resulting from triple differentiation.

Figure 1:
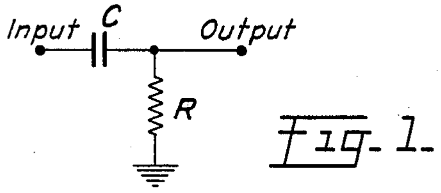
FIGURE 1 is a schematic of the coupling network of a conventional pulse amplifier.

The conventional pulse amplifier has interstage coupling networks of the resistance-capacitance type, such as shown in FIGURE 1. When a voltage step, which is the type of signal obtained from a radiation detector, as indicated in the diagram of FIGURE 2, is applied to a network of the type of FIGURE 1, the shape of the pulse is altered in the manner indicated in the diagram of FIGURE 3, since it obeys the law:

$$Ve^{-\frac{t}{RC}}$$

Figure 2:
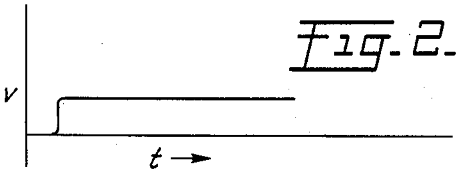
FIGURE 2 is a diagram of a voltage step applied to the network of FIGURE 1.
Figure 3:
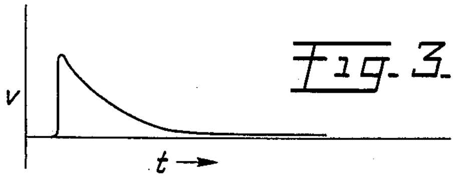
FIGURE 3 is a diagram of a voltage curve as it leaves the network.
Figure 4:
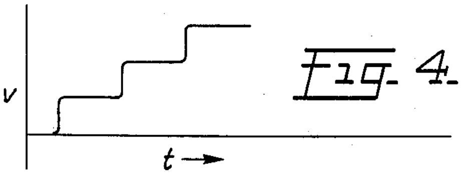
FIGURE 4 is a diagram showing the pile up of wave shapes before being applied to the network.
Figure 5:
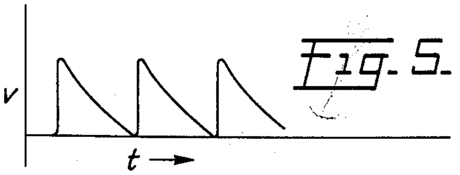
FIGURE 5 is a graph showing how pile up is reduced by the network.

In this equation, V is the peak value of the voltage step shown in FIGURE 2, $t$ is time in seconds and R and C are the constants of the network of FIGURE 1 in ohms and farads. In a conventional amplifier a number of these networks are used, and one of the networks is designed to have a considerably shorter time constant than the others, where the time constant is defined as RC. The shortest time constant may be chosen to be from .5 to 10 microseconds, otherwise the pulses would tend to pile up in the manner indicated in the diagram of FIGURE 4. For a more complete discussion of this problem of pile up see the work of Elmore and Sands, supra, pages 124–128. By choosing a short time constant for one of the coupling networks, the wave may be brought back to the base line after each pulse, and this problem is overcome as indicated in the graph of FIGURE 5.

Figure 6:
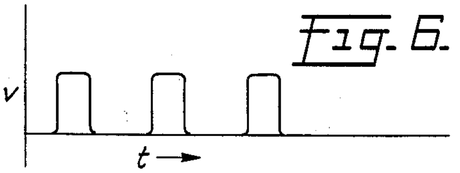
FIGURE 6 is a graph of the same waves resulting from the use of a shorted delay line coupling network.

Instead of using a circuit employing a resistance-capacitance coupling network with a short time constant RC circuit, a short circuited delay line is frequently used for this purpose. Elmore and Sands, supra, page 134. The pulses then appear as indicated in the diagram of FIGURE 6. A network which converts a step function into a narrow pulse is termed a "differentiating network," because the output of such a network is proportional to the rate of change of the voltage applied to it. Thus, in FIGURE 3, the voltage output is greatest during that part of the step of FIGURE 2 where the rate of change of voltage with respect to time is greatest, and the voltage output approaches zero during that part of the step where the rate of change of voltage with respect to time is zero.

Where a number of RC coupling networks, delay line coupling networks, or a combination of RC and delay line coupling networks are used in a conventional amplifier, a careful observation of the output pulse, when a step of voltage is applied to the amplifier, will establish that the output voltage, instead of approaching the base line asymptotically after the pulse will cross the base line and oscillate about it for a number of cycles. (See page 119, Valley and Wallman, supra.) It can be shown that the wave crosses the base line one less time than the number of coupling networks used.

Figure 8:
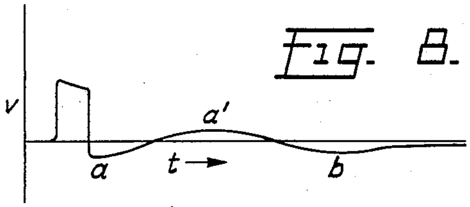
FIGURE 8 is a graph showing an output pulse where the amplifier employs a delay line and three RC networks, and the amplitude scale is distorted as in FIGURE 7.
Figure 7:
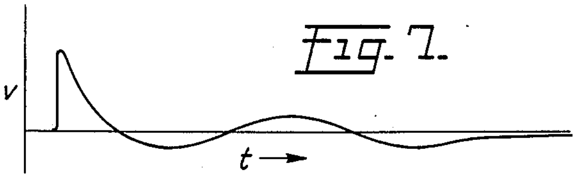
FIGURE 7 is a graph showing a pulse from an amplifier using four RC coupling networks where the amplitude scale is distorted to emphasize the undershoots and overshoots.

Thus, in FIGURE 7 an output pulse from an amplifier using four RC coupling networks is shown, when a step of voltage is applied to the input of the amplifier. In FIGURE 8, the result is shown where one short circuited delay line and three RC networks are used in the system. It will be observed that the wave crosses the base line three times in each case. It has been established that in such an arrangement, the total area of the pulse above the base line is equal to the total area of the pulse below the base line.

Figure 9:
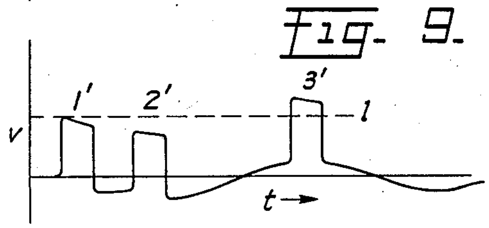
FIGURE 9 is a graph showing the effect on pulse height when additional pulses fall on the tail of the original pulse, and the amplitude scale is distorted as in FIGURES 7 and 8.

In a radiation spectrometer where voltage pulses of the type referred to above are produced as the result of radioactive disintegration, it is desired to determine the number of disintegrations per unit time and to sort them according to amplitude. It will be observed from the graph of FIGURE 7 that each disintegration would give rise to a single large pulse followed by one or more smaller ones. It is necessary to arrange the counting system so that only the largest pulse is counted, otherwise a false determination would be made of the number of disintegrations occurring per unit time. Also, it will be observed that if a disintegration occurs before the amplifier has recovered from the effects of an earlier disintegration, it may be incorrectly measured. For instance, consider the situation where three pulses of equal magnitude, as indicated by the dotted line 1 of FIGURE 9, are to be counted. Since each pulse has a tail, as indicated in FIGURE 8 in connection with a typical pulse, it is possible for the second and third pulses to occur during the time interval of the tail of the first pulse, and the solid line curve of FIGURE 9 indicates the situation where one of the pulses 2′ falls in the trough, and the other pulse 3′ falls on the crest of the tail of the first pulse 1′. Since the conventional pulse amplitude discriminator measures the height of the pulse above the base line, it is apparent that the second pulse 2′ will appear smaller than it actually is, while the third pulse 3′ will appear larger than it actually is.

Referring again to FIGURE 8, we can call the peak amount by which the tail of the pulse extends above or below the base line as the overshoot and undershoot, respectively. Each of these can be counted, starting from the main pulse, as first undershoot *a*, second undershoot *b*, first overshoot *a′*, etc. In the conventional amplifier the time constant of one of the coupling networks is made very much shorter than that of the other coupling networks. It is also customary for the remaining coupling networks to have equal time constants. For example, the second and succeeding coupling networks of an amplifier usually have a time constant one hundred times greater than that of the first coupling network. When this condition applies, the first undershoot will be $\frac{1}{100}$ of the amplitude of the original pulse. The first overshoot will be approximately $\frac{1}{100}$ as large as the first undershoot, and each succeeding undershoot and overshoot will be progressively smaller than the preceding one.

Since the area of the total wave above the base line must equal the area of the total wave below the base line, an undershoot of low amplitude will result in a long recovery time. This situation contributes to a long tail and is undesirable because it increases the probability of succeeding pulses falling on the tail and being incorrectly measured. Conversely, an undershoot of large magnitude will result in a quick recovery time.

Now we can consider the situation of a spectrum of a radioactive source containing two components, one of which gives rise to pulses one-hundred times as great in magnitude as that of the other. The larger amplitude pulse can be measured without difficulty, but the pulses of smaller amplitude cannot. If, for example, as herebefore indicated, it is assumed that the first undershoot is 1% of the pulse which causes it, by virtue of the time constants chosen for the coupling networks, it is evident that the measurement of the pulses of smallar magnitude will be interfered with by the presence of the undershoots resulting from the pulses of large magnitude, since these undershoots may have the same magnitude as the pulses to be measured. Furthermore, if we define the dead time of the amplifier as that time during which a pulse will be measured with an error of more than 1%, it is also evident that the dead time for the measurement of the small pulses will be approximately one-hundred times greater than the dead time for the measurement of the large pulses, since a small undershoot results in a long recovery time.

One possible solution to the problem would be to make the time constant of one coupling network $\frac{1}{10,000}$ of that of the other coupling network. However, in a practical amplifier this is an undesirable solution, because of a number of reasons which have to do with stability, low frequency noise, physical bulk of the components, and high frequency response.

Figure 10:
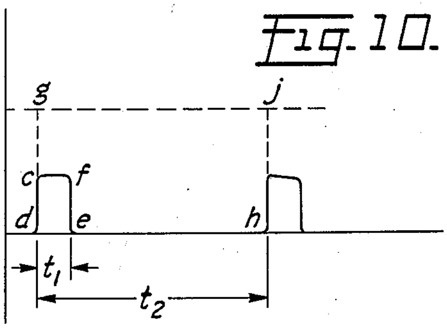
FIGURE 10 is a graph indicating the meaning of the term "duty cycle."

Another factor effecting the problem is base line shift, and this involves the consideration of the duty cycle. Referring to the graph of FIGURE 10, two pulses are shown separated by a time $t_2$. It will be assumed that $t_2$ represents the average spacing between pulses in a given operating situation. $t_1$ is the width of the pulses from the amplifier. The dotted line *g—j* represents the maximum amplitude of pulses the amplifier is expected to transmit. The duty cycle may then be defined by the following equation:

$$\frac{\text{area enclosed in } cdef}{\text{area enclosed in } gdhj}$$

If the amplitude of most of the pulses is closed to the maximum amplitude the amplifier was designed to transmit, as indicated by the dotted line, then the duty cycle is approximately equal to $t_1/t_2$. It follows that the measured pulse height will be lower than the true pulse height by the amount equal to the duty cycle. As a result of this fact, in a practical measurement, the disintegration rate of a sample is limited to an amount which results in a duty cycle not exceeding .01.

Figure 11:
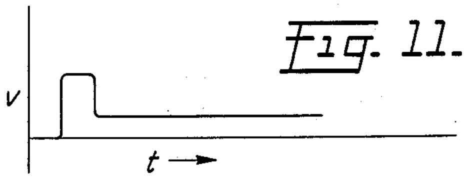
FIGURE 11 is a graph showing the effect on a voltage wave fed to a shorted delay line which has resistive loss.
Figure 12:
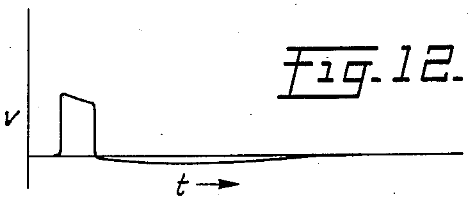
FIGURE 12 is the pulse shape which results from the use of an RC corrective network in the system on such a delay line pulse shaper.
Figure 13:
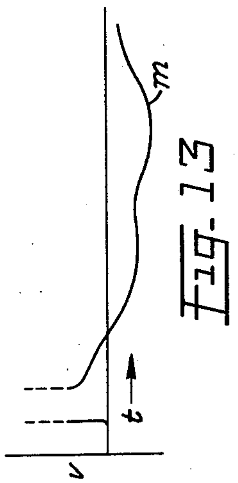
FIGURE 13 is a graph showing the effect of the frequency response of the delay line which results in a long tail following the initial pulse. The amplitude scale in this case has been altered to accentuate the effect.

There are som· additional difficulties which arise in the use of a single shorted delay line as a means of pulse shaping. (See the patents to Fairstein, 2,694,146 and Bell, 2,760,064, as examples of circuits using shorted delay lines for pulse shaping.) One defect arises from the fact that the delay line has a measurable resistive loss so that the trailing edge of a step of voltage fed thereto will not return to the base line, as indicated by the chart of FIGURE 11. (See also page 133, Elmore and Sands, supra.) The usual remedy for this situation is to use an RC corrective network which results in a pulse of the general shape shown in FIGURE 12. This remedy has the undesirable characteristic that an undershoot always results from its application. Another defect is associated with the frequency response of the delay line which results in a long tail *m* following the initial pulse as indicated in the graph of FIGURE 13, where a pulse of the type shown in FIGURE 12 is exaggerated in size to show the effect. This condition is usually tolerated since the remedy heretofore suggested to meet it is too complex to be feasible.

Figure 14:
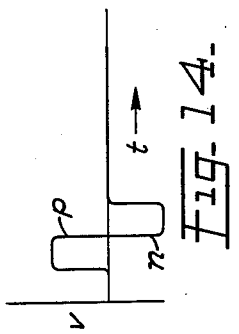
FIGURE 14 is a graph showing the pulse shape resulting from the use of our improved circuit in a pulse amplifier.

Applicants' invention overcomes these defects by employing a circuit including two differentiating networks of substantially equal time constant inserted in an amplifier. These differentiating networks preferably take the form of shorted delay lines but may take any other suitable form of network. The pulse shape which results in this combination is generally shown in FIGURE 14, wherein the undershoot *n* is of substantially the same magnitude as the original pulse *p*. This likewise results in a tail whose duration is substantially the same as the duration of the initial pulse, which in turn results in greatly decreased probability of a succeeding pulse falling on the tail, and being incorrectly measured. In this connection, it will be understood that the undershoot of the largest amplitude and shortest duration occurs when two of the coupling networks have time constants which are equal to each other and smaller than those of the remaining coupling networks. Not only is the maximum usable counting rate increased by the use of double clipping, but it also becomes possible to place one clipper near the input of the amplifier to reduce the effects of pile up, and the second clipper in a later stage to reduce the low frequency noise generated in the early stages.

In addition, the magnitude of the succeeding overshoots and undershoots resulting from the remaining RC coupling networks in the amplifier become so small by virtue of the application of the above technique that their effect on a pulse amplitude measurement becomes insignificant. In fact, it becomes possible to make the coupling network from the output of the amplifier appreciably shorter than it would otherwise have to be without having an adverse effect upon the pulse shape. This last short time constant network appreciably attenuates the low frequency noise, hum, and residual long period overshoots from the earlier RC coupling networks. Because of the short duration of the overshoot which results in rapid restoration of the pulse to the base line, it is possible to count samples whose disintegration rates result in duty cycles of 10% to 20% with an error no greater than would result from counting with a conventional amplifier with a duty cycle of 1%.

Furthermore, by using two delay lines, the undesirable effects produced by the resistive losses in the lines and the undesirable frequency response of the line is reduced to a point of insignificance. This will be apparent from the graph of FIGURE 15 where the solid line curve represents the output of the first delay line when a step of voltage has been applied to it, and the dotted curve represents the contribution by the second delay line when the output of the first line has been applied to it. In this example, it has been assumed that the reflected wave in each of the lines has undergone a loss of 10% due to the resistance of the line. It will be further noted that whereas the tail of the pulse through the first shorted delay line remains 10% above the base line, the tail of the composite pulse as indicated by the dotted line is only 1% above the base line. In a similar fashion, the tail resulting from the poor frequency response of the delay line as shown in FIGURE 13, is also cancelled.

Referring now to the circuit of FIGURES 16A and 16B, it will be seen that the amplifier feed back groups, generally designated A, B, and C, are coupled in cascade. While the feed back group may take any suitable form, the one preferred by applicants is of the type described and claimed in the prior copending application of Fairstein, Serial No. 484,086, filed January 25, 1955. For example, feed back group A is fed by a cathode follower 32A and comprises three stages with the first stage, a cathode coupled amplifier 32B, and the other two stages 34 and 35 being plate amplifiers cascaded by conventional resistance-capacitance coupling 36 and 37, respectively. Similarly, feed back group B is fed by cathode follower 41A and comprises cathode coupled amplifier 41B and plate amplifiers 43 and 44, and feed back group C is fed by cathode follower 46A and comprises cathode coupled amplifier 46B and plate amplifiers 48 and 49.

The three amplifier feed back groups A, B and C are combined into a system by providing a conventional preamplifier in the form of a double triode 23 as the input stage, with the cathode of one section of the tube connected to one side of one section of dual condenser 24 and the anode of the other section of the tube being coupled to the common side of the dual condenser 24 which has the other side of the second section thereof grounded. The output of the preamplifier 23 feeds a differentiating network 33 which serves to couple the preamplifier to the first feed back group A through cathode follower 32A and preferably takes the form of a short circuited delay line 27 such as that referred to on page 132 of Elmore and Sands, supra, and as disclosed in the patents to Fairstein, supra, and Bell, supra, a variable resistance 26 which serves as a termination adjustment and may be adjusted to match the characteristic impedance of the delay line cable, and a condenser 25 to compensate for the residual tail of the pulse. The single resistor 26 may be satisfactorily employed to correct for mistermination of the delay lines.

The output of the first feed back group A of FIGURE 16A is then coupled to the input of the second feed back group B of FIGURE 16B by a second differentiating network 42 which feeds the cathode follower 41A that precedes the second feed back group B. This coupling includes a voltage divider 38 whose variable tap is coupled into and feeds the input circuit of an amplifier 39 through a conventional RC circuit 40. The output of amplifier 39 feeds differentiating network 42 which preferably includes a short circuited delay line 30 of the type heretofore described, which terminates in a resistor 29. Condenser 28 aids in compensating for the residual tail of the pulse.

The output of the second feed back group B is then coupled to the input of the third feed back group C, as shown in FIGURE 16B, preferably by a conventional RC coupling network 45. The output of the last feed back group C may then be coupled to an output stage 47 through an RC coupling network 31 of short time constant. This latter network is employed to reduce low frequency noise, hum, and the residual long period overshoots and undershoots in the circuit.

Figure 15:
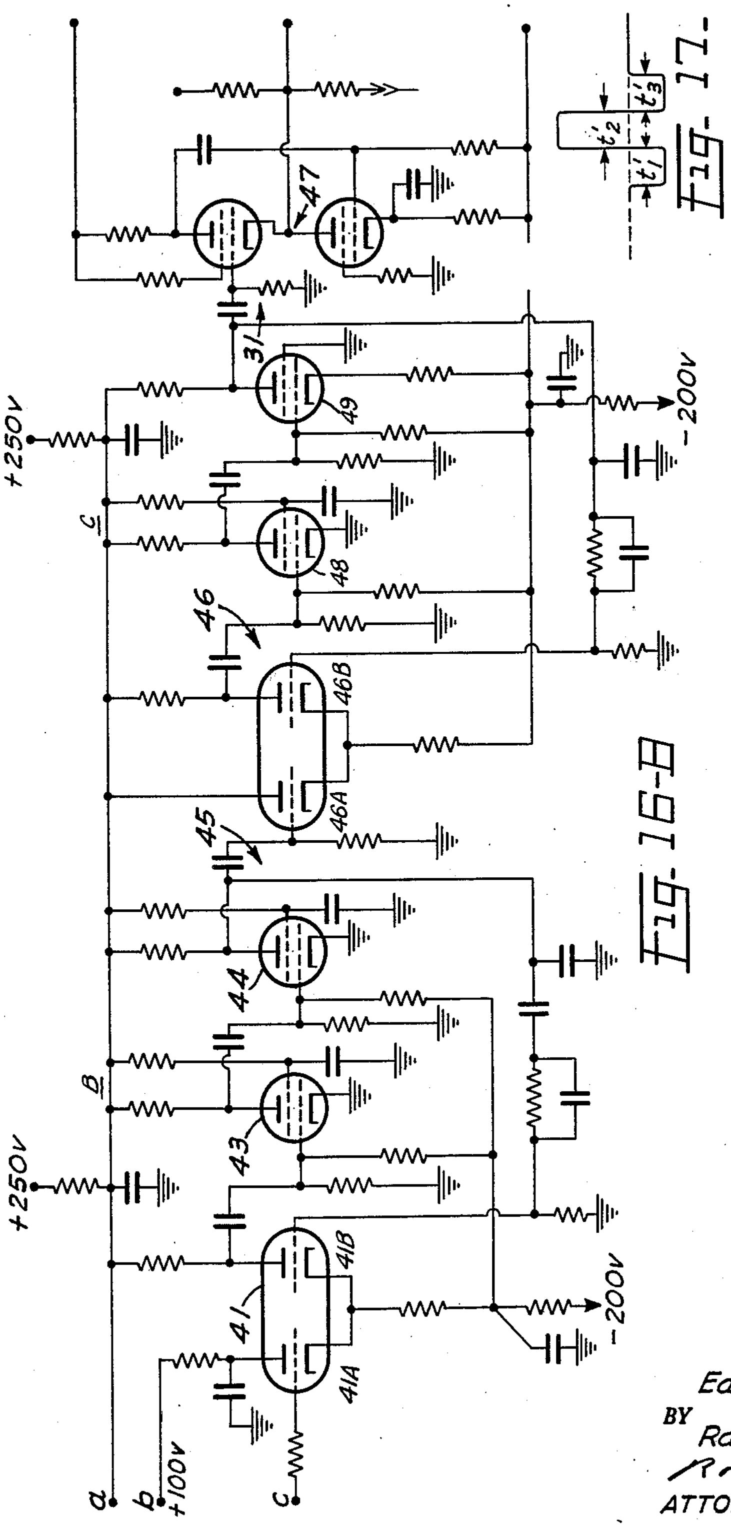
FIGURE 15 is a graph showing the effect of the use of two delay lines with resistive losses in a pulse amplifier.
Figure 15:
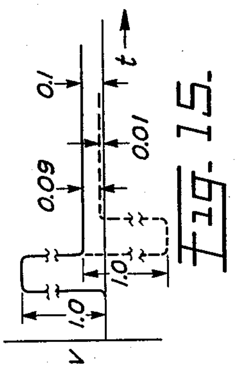

In its operation, pulses from a radiation detector (not shown) are fed to the system and amplified by preamplifier 23 and differentiated by a differentiating network 33 where the first short circuited delay line 27 reduces pile up and where the step pulses from the radiation detector are brought back towards the base line, as indicated in the solid line curve of FIGURE 15. The output of differentiating network 33 of FIGURE 16A is fed to feed back group A where the pulses are amplified and fed to a second differentiating network 42 where they are differentiated again giving undershoots of almost the same magnitude as the original pulse and of short duration, as indicated by the dotted line of FIGURE 15. The output of differentiating network 42 then feeds cascaded feed back groups B and C, as shown in FIGURE 16B, which serve to amplify the pulses, and provide at the output stage 47, pulses with short undershoots which will permit faster counting without false operation.

The differentiating networks may be positioned at any desired location in the amplifier, that is, they may be cascaded, one following the other, or at the extremities of the circuit, or at other locations. However, the preferred manner of associating them in an amplifier circuit is to place one at the input and the second spaced therefrom by a portion of the amplifier. In the preferred embodiment, the first differentiating network is located at the input of the amplifier in order to avoid pile up of pulses, while the second differentiating network is separated from the first differentiating network by a section of amplifier whose gain is 50 to 100. This results in reduction of hum and low frequency noise which arises in the preceding stages of the amplifier. It also compensates for the tail of the first differentiating network before the pile up level of the tail of the first network can impair the operation of the amplifier.

From the foregoing, it will be apparent that it is not necessary to stop at double differential, but that it is possible to go a step further and have triple differentiation by employing a third differentiating network in a manner similar to that heretofore illustrated in connection with two networks. Such an arrangement has certain definite advantages. These can best be illustrated by reference to FIGURE 17 of the drawings wherein $t'_1$, $t'_2$, $t'_3$ are the spacings which preferably are equal, but need not necessarily be so. If these spacings are made equal, it will turn out that the amplitude of each of the negative pulses is equal to ½ of the amplitude of the positive pulse. Regardless of the pulse widths, the area of the negative pulses will equal the area of the positive pulse.

The advantages which result from this arrangement are:

(1) Because of lower amplitude, the negative pulses do not require as much power and/or as much current through the output tube to obtain a given size of positive pulse.

(2) Because of the limitation of commercially available delay lines, the amount of overload without causing base line shift is limited, and triple differentiation extends this limit by a substantial amount, i.e., up to five times.

It is often necessary to use the leading edge of the signal to gate a circuit connected with the measurement of pulse height. In cases like this the timing precision is frequently important with the pulse shape as just described, the leading edge of the positive pulse has a greater rate of rise than in the earlier types of pulse shapers. By virtue of this greater rate of rise, the timing accuracy is improved.

Having thus described our invention, we claim:

1. A pulse amplifier for limiting the effects of undershoots comprising a series of amplifying stages, a series of coupling circuits for coupling the stages together in cascade to form an amplifier system, said series of coupling circuits including a pair of differentiating networks, each comprising a short circuited delay line, said delay lines having substantially the same time constant, one of said differentiating networks being positioned adjacent the input of the series of stages and serving as the input coupling for said stages and another of said differentiating networks being positioned adjacent the output of the series of the stages to reduce the duration and increase the amplitude of the undershoots of pulses passing through the system, and means for feeding step pulses to the input of the first of said series of stages.

2. A pulse amplifier for limiting the effects of undershoots comprising a series of amplifying stages, a series of coupling circuits for coupling the stages together in cascade to form an amplifier system, said series of coupling circuits including a pair of differentiating networks, each comprising a short circuited delay line, said delay lines having equal time constants which are shorter than the other coupling networks of the system, one of said differentiating networks being positioned adjacent the input of the series of stages and serving as the input coupling for said stages and another of said differentiating networks being positioned in an intermediate portion of the series to reduce the duration and increase the amplitude of the undershoots of pulses passing through the system, and means for feeding step pulses to the input of the first of said series of stages.

3. A pulse amplifier for reducing the effects of overshoots comprising a plurality of amplifier feed back groups, each of said groups including a plurality of cascaded amplifying stages with a feed back loop for coupling the output of a later one of said stages to an earlier one of said stages, individual coupling circuits for cascading the feed back groups into an amplifier system, at least two of said coupling circuits including a short circuited delay line to increase the magnitude and decrease the duration of undershoots from pulses passing through the system, and means for feeding step pulses to the input of the first of said feed back groups.

4. A pulse amplifier for limiting the effects of undershoots comprising a series of amplifier feed back groups, each of said groups including a plurality of resistance-capacitance coupled amplifying stages with feed back loops, individual coupling circuits connecting the feed back groups for cascading them into an amplifier system, said coupling circuits including at least one differentiating network comprising a short circuited delay line positioned in an intermediate portion of the system to reduce noise, and a further differentiating network comprising a short circuited delay line positioned at the input to the first of said feed back groups to reduce pile up, and means for feeding step pulses to the input of the amplifier system, whereby to increase the amplitude and reduce the duration of undershoots from pulses passing through the system.

5. A pulse amplifier for limiting the effects of undershoots comprising a series of amplifier feed back groups, each of said groups including a plurality of resistance-capacitance coupled amplifying stages with feed back loops, individual coupling circuits connecting the groups together for cascading them into an amplifier system, at least one of said coupling circuits including a differentiating network comprising a short circuited delay line positioned in an intermediate portion of the system to reduce noise, and at least one of the other of said coupling circuits having a further differentiating network comprising a short circuited delay line positioned at the input to the first of said feed back groups to reduce pile up, said first named delay line and said second named delay line having time constants which are equal and less than the time constants of the other coupling networks of the system for increasing the magnitude and decreasing the duration of undershoots from pulses passing through the system, and means for feeding step pulses to the input of the amplifier system.

References Cited in the file of this patent

UNITED STATES PATENTS

| | | |
|---|---|---|
| 1,452,933 | Pupin | Apr. 24, 1923 |
| 2,154,076 | Rust | Apr. 11, 1939 |
| 2,531,164 | Sands et al. | Nov. 21, 1950 |
| 2,546,371 | Peterson | Mar. 27, 1951 |
| 2,571,045 | Macnee | Oct. 9, 1951 |
| 2,710,944 | Bangert | June 14, 1955 |
| 2,948 854 | Bess | Aug. 9, 1960 |
| 2,956,231 | Obraz | Oct. 11, 1960 |